July 20, 1965  R. R. BALAGUER  3,195,830
MOTORIZED FISHING REEL
Filed July 1, 1963  2 Sheets-Sheet 1
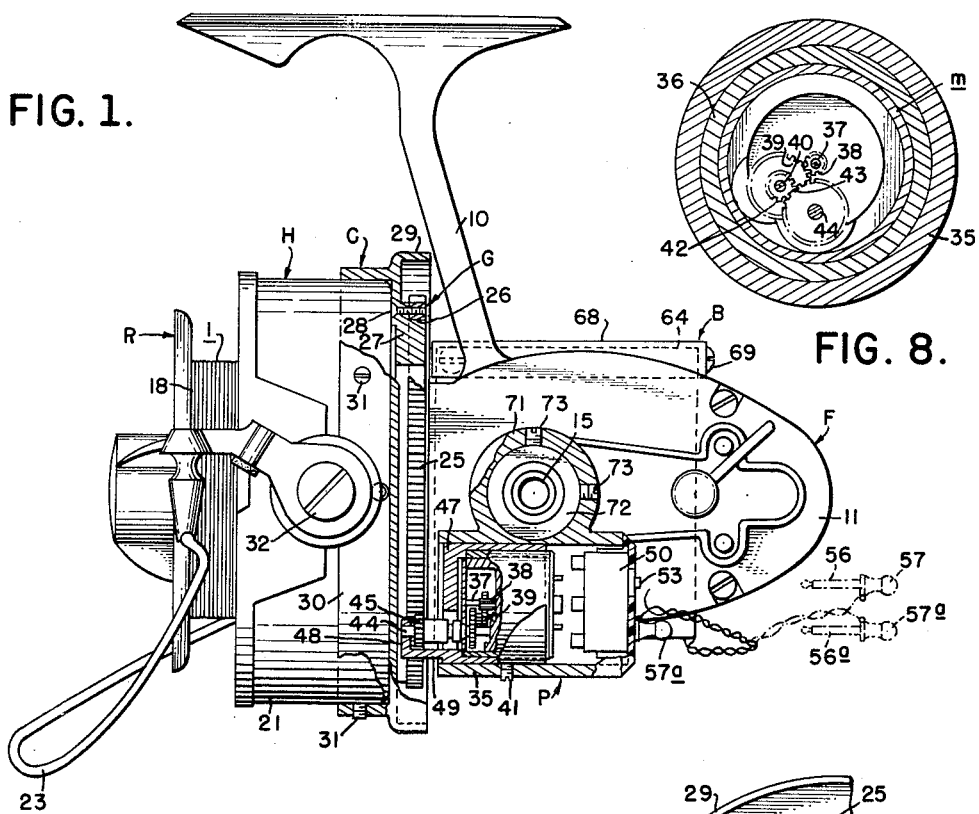
FIG. 1.
FIG. 8.
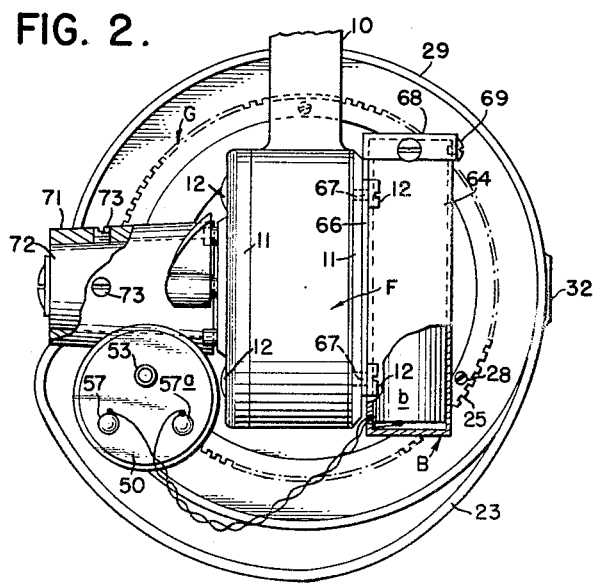
FIG. 2.
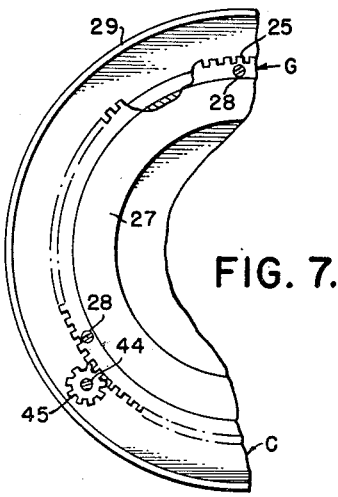
FIG. 7.
INVENTOR.
RODOLFO R. BALAGUER
BY
Ephraim Ihmming III
ATTORNEY July 20, 1965   R. R. BALAGUER   3,195,830
MOTORIZED FISHING REEL
Filed July 1, 1963   2 Sheets-Sheet 2

INVENTOR.
RODOLFO R. BALAGUER
BY
ATTORNEY

United States Patent Office 3,195,830
Patented July 20, 1965

3,195,830
MOTORIZED FISHING REEL
Rodolfo R. Balaguer, Fort Lauderdale, Fla., assignor to
J. D. Hedges and Company Limited Partnership, Kingston, Jamaica, a limited partnership of Cuba
Filed July 1, 1963, Ser. No. 292,019
10 Claims. (Cl. 242—84.21)

This invention relates to a combination of units applicable to a conventional spinning type of manually-operated fishing reel whereby to convert it to motorized operation. More particularly, it is concerned with the accomplishment of this end by means which are simple, facile of application, and effective in operation.

A reel of the kind for which the present invention is designed utilizes a hollow frame for accommodation of a power transmission from a crank handle to a reel spool and, coaxially thereof, a circular line-guiding head, both mounted exteriorly of the frame, usually at one end thereof. In operation, the spool is reciprocated slowly toward and from the head which is concurrently rotated to carry with it a line-guiding bail which acts to distribute the line more or less evenly, lengthwise of the reel spool, during a line-winding operation. Application to such a reel of the units which constitute my invention does not involve any change or modification of the reel frame. The crank handle may be removed, however, since its presence will thereafter be superfluous.

It is accordingly an object of this invention to provide a set of conversion units which may be mounted upon the reel frame without any change or modification thereof, which may be readily and fixedly secured in operative positions thereon with the aid of only the simplest of tools, such as a screw driver, and which, when installed, will furnish ample power for winding of a line upon the reel, even though a large game fish be hooked thereon requiring a hoisting force of considerably more than 100 pounds to complete its capture. I accomplish these various objectives by means which are durable, compact, light and simple, and which involve but three units, viz., a power unit in the form of a small high-speed electric motor, a speed-reducing transmission extending from the motor to the head to impart rotation thereto, and an energy source in the form of a pack of series-connected dry chemical batteries in circuit with the motor, a normally-open controlling switch being interposed in the circuit at a point which is convenient for manipulation by the person using the rod.

Figure 3:
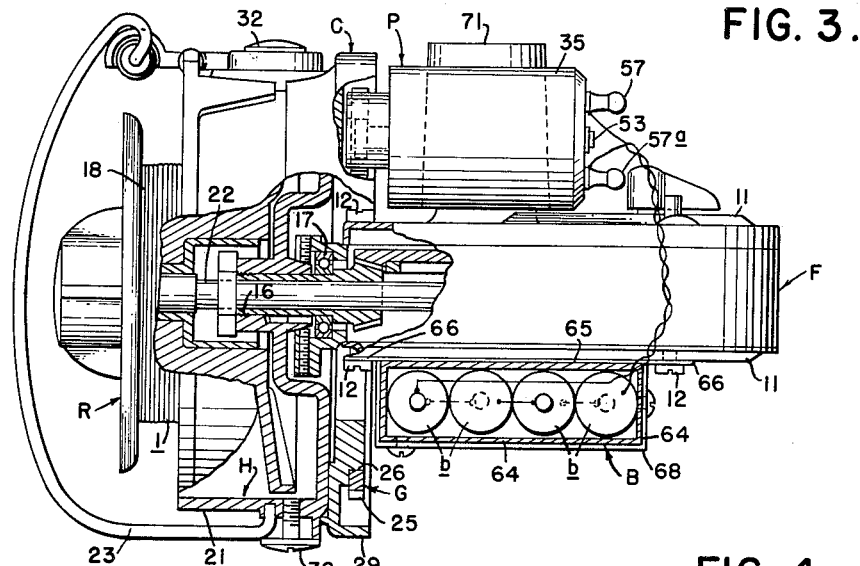
Figure 4:
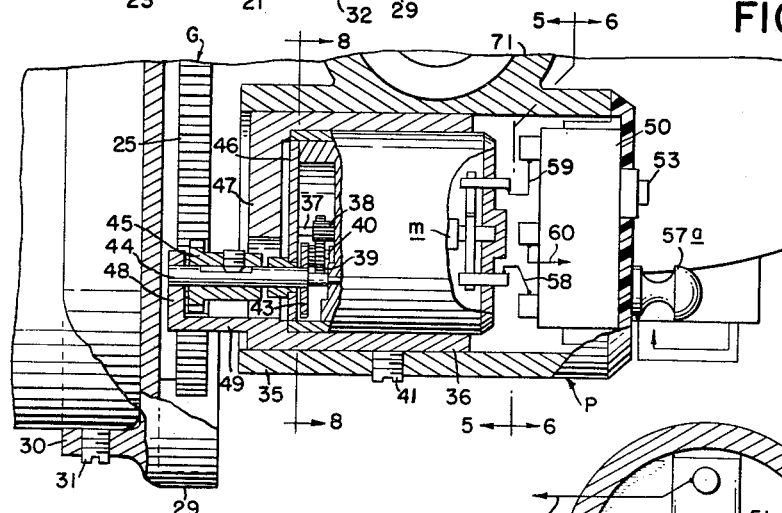
Figure 5:
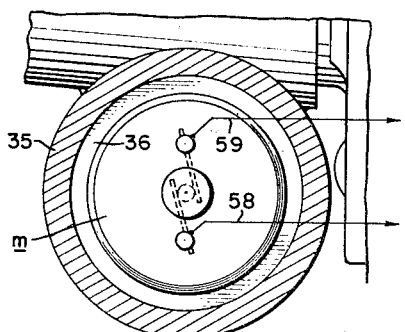
Figure 6:
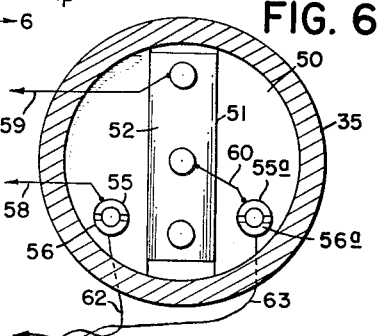

A suggestive embodiment of this invention is illustrated in the accompanying drawings wherein:

FIGURE 1 is a side elevation of the reel, with portions of the power unit broken away to expose interior parts thereof; FIG. 2 is a rear elevation of the reel, with portions of the power unit and battery pack broken away to expose interior parts thereof; FIG. 3 is a top elevational view, with portions of the reel head, frame and battery pack broken away to expose parts interiorly thereof; FIG. 4 is an enlarged fragmentary view in longitudinal section through the power unit and transmission connected therewith; FIG. 5 is an enlarged transverse sectional view taken on line 5—5 of FIG. 4, looking in the direction of the arrows; FIG. 6 is a similar view taken on the same line as FIG. 5, but looking in the opposite direction; FIG. 7 is an enlarged detail in section, taken on line 7—7 of FIG. 1;

and FIG. 8 is a transverse sectional view taken on line 8—8 of FIG. 4, looking in the direction of the arrows.

The reel structure herein illustrated comprises a hollow frame F to which a bracket arm 10 is joined for support thereof upon a rod (not shown) in a manner that is well known. Opposite sides of the frame which are open are provided with closure plates 11 configured in conformity with the frame to which they are connected as by through screw bolts 12. The frame with closure plates applied defines an elongated chamber wherein is accommodated a transmission between a manually-operated driving shaft 15 (FIG. 1) and a hollow driven shaft 16 (FIG. 3), here shown as the elongated hub of a bevel gear which is comprised in the transmission. The driven shaft which extends from within the chambered frame to lie in part exteriorly thereof is mounted for rotation within a suitable bearing 17 (FIG. 3), and carries fast on its outer end portion a head H adjacent a coaxial reel spool R having a relatively large diameter spool 18. Extending from the head toward the reel spool is a peripheral flange 21 defining a circular space into which the reel spool may be axially shifted in response to a like motion of its supporting rod 22 (FIG. 3) which is extended axially through the driven shaft 16. The head H also carries a line guide 23 in the form of a bail which is pivotally mounted to swing between line-casting and line-winding positions in the latter of which it acts to distribute the line more or less evenly upon the reel spool. During this operation the head is rotated while the reel spool is slowly reciprocated axially. A reel mechanism of this general description forms no part of my invention per se. It furnishes, however, a structure to which are applied certain units constituting the present invention whereby to convert a manually-winding mechanism to one which is motorized.

The units forming my invention are three, viz., a ring gear G, a power unit P, and a battery pack B, the latter two being electrically interconnected (FIGS. 1, 3, and 4). Each of these units is provided with special mounting means whereby it is readily applicable to a manually operable fishing reel of the general kind already described. The construction and design of the mounting means is such in each case as to facilitate installation of the associated unit, and with only the simplest tools required for its fixed attachment in operative position upon the reel structure.

The gear G which is in the form of a large ring having teeth 25 arranged exteriorly thereof is positioned in a seat 26 formed in the annular wall 27 of a ring-shaped carrier C to which it may be secured as by means of screws 28. A circular flange 29 extended peripherally from the carrier wall 27 overlies the gear teeth 25 in spaced relation thereto. A second circular flange 30 extends from the carrier ring to overlie the head H, and set screws 31 traversing this flange are adjustable to engage the head to secure the carrier fast thereto. Notches formed in the head flange 21 at diametrically opposite points accommodate therein pivotal mountings 32 for the swinging bail 23 which acts to distribute the line *l* more or less evenly upon the reel spool during each line-winding operation.

The power unit P, as shown, comprises a cylindrical barrel 35 mounting in one end portion thereof a cylindrical casing 36 containing a motor *m* having a drive shaft 37 whereon is a fixed gear 38 of small size meshing with a larger gear 39 carried fast on a first intermediate shaft 40. As by means of one or more set screws 41, the position of the casing within the barrel, both rotatively and axially, may be adjustably fixed. A second gear 42 of relatively small size is also carried fast on the shaft 40 in position to mesh with a larger gear 43 which is carried fast on a second intermediate shaft 44 (see FIG. 8). This latter shaft is extended outwardly beyond the confines of the barrel 35 to carry fast a further gear 45 which is positioned adjacent the ring gear G to mesh with the teeth 25 thereof. Elements 37, 38, 39, 40, 42, 43, 44 and 45 as described above cooperatively form a driven shaft-gear unit. All of the shafts and gears in this transmission train rotate about coparallel axes, these shafts being mounted within suitable bearings within the casing 36. The second intermediate shaft 44 which extends axially beyond the casing and barrel end walls 46 and 47, respectively, is also journaled within an apertured wall 48 which is supported beyond the gear 45 upon an arcuate arm 49 that is joined to the casing 36 and disposed adjacent the periphery of the said gear to provide against contact therewith during normal operation of the reel.

Access into the barrel end portion opposite its wall 47 is afforded by removal of a cap 50 of plastic or the like having a circular body extended axially therefrom inwardly of its periphery in position to frictionally engage the inner face of the barrel when entered thereinto. A wide slot 51 extending diametrically of the cap body accommodates therein a normally-open micro switch 52 equipped with a depressible operating button 53 which is exposed for manipulation upon the cap outer face. A pair of spring sockets 55 and 55a which are anchored in the cap are also exposed upon their outer faces to receive therein a pair of contact pins 56 and 56a (FIGS. 1 and 6) having heads 57 and 57a to facilitate manipulation of the pins into and out of their associated sockets whenever desired. When fitted into the spring sockets, the pins 56 and 56a will normally be held against displacement except when subjected to an axial pulling force sufficient for this purpose. Opposite poles of the motor m are electrically connected, as by wires 58 and 59, with one side of the switch and one socket, respectively, the opposite side of the switch being connected through a wire 60 with the remaining socket.

The power pack B consists of one or more series-connected chemical dry batteries b with flexible connections 62 and 63 extended from opposite poles thereof to the contact pins 56 and 56a. In the arrangement shown, four such batteries, each having a potential of about 1½ volts, are connected up in series to provide an overall potential of about 6 volts for operation of the motor m. The pack of batteries b is enclosed in a suitable box 64 mounted upon a base plate 65 having at opposite edges thereof projecting tongues 66, each being provided with an opening 67 adapted to register with one of the screw bolts 12 to permit its insertion therethrough whereby the power pack may be secured fixedly to the reel frame F exteriorly thereof. One wall 68 of the box is shown as removably secured in place by a screw 69 to permit opening of the box for insertion therein of fresh batteries, whenever desired.

The barrel axis is parallel with that of the driven shaft 16 whereon the head H is mounted, and to maintain the power unit P in a fixed position its supporting barrel 35 is joined medially of its length to a sleeve 71 whose axis is transverse thereto. This sleeve provides a socket whose interior face is coned to engage wedgingly with a correspondingly tapered face on the exterior of a hollow boss 72 which protrudes outwardly from one of the side plates 11 in surrounding relation to the manual driving shaft 15. When fitted upon the boss, the sleeve may be held firmly in place with assistance from one or more set screws 73 which are adjustable to engage therewith. As a consequence, the power unit P remains affixed to the reel structure in the position requisite for rotating the head H whenever the motor m is properly energized for this purpose.

A feature of this invention which contributes to its importance is the simplicity of the several units which are designed for mounting upon a reel structure as herein described with the aid of a single tool, such as a screw driver, and without involving machine operations of any kind. As a result, these units may, if desired, be removed if and when there should be any desire to convert the reel back to hand operation. One feature of advantage is the special provision for high amplification of the power delivered by a very small motor to operate a reel whose hoisting capacity should be a hundred or more pounds, all with the energy supplied from a very compact battery pack. An an example, the optimum efficient r.p.m. of such a motor m should be high, perhaps 30,000 or more; the transmission of power therefrom to the reel in the present mechanism involves three points of speed reduction—one where the power is first transferred to the first intermediate shaft gear 39, the next at the meshing point of the gears 42 and 43, and the last where the gear 45 meshes with the ring gear G, a feasible total reduction in r.p.m. being 175:1 or more. This transmission of power, it should be noted, originates with the motor m and ends with the head H after proceeding through shafts and gears all having parallel axes, thereby assuring the maximum of eficiency in this type of transmission.

It should be noted that each of the three units—the ring gear and carrier ring therefor, the motor and associated transmission, and the battery pack—is mounted on the reel frame independently of the others with full freedom for separate removal therefrom. This is advantageous in more ways than one. The power unit, for example, utilizes a number of moving parts which should be cleaned, oiled, and possibly serviced at widely spaced intervals, so its removal for any such purpose, without disturbance of the remaining units, is a desideratum to be sought. In any such operation, a disconnection of the circuit from the battery pack, as by pulling out the contact pins 56 and 56a from the two sockets 55 and 55a, is a facile step as is the subsequent restoration of this circuit when the power unit is replaced in its operative position. One further point to be noted in this connection is the adjustability of the gear 45 relative to the teeth 25 of the ring gear with which it meshes. This is performed by changing the rotative position of the motor casing 36 within the barrel 35. The shaft 44, being located off-axially of the casing, tends to describe an arc wherever any rotative adjustment of the casing is made. The gear 45 will concurrently undergo a shifting movement toward or from the gear teeth 25, whereby to enable the user to arrive at the optimum meshing position of one with respect to the other. Repeated use of the reel, when motorized as herein described, will necessitate an occasional substitution of fresh new batteries b for those which have become partly or fully exhausted. For this purpose the battery box 64 may be opened, as by removal of its side 68, to permit the desired substitution; alternately, the entire box and contents may be removed for replacement by a substitute new box, complete with fresh new batteries. This latter procedure may be preferred if and when a complete new battery pack, utilizing an inexpensive box of paper or the like, is readily available when needed.

I claim:

1. A motorized spinning type fishing reel comprising a hollow frame, a manually operated driving shaft supported by said frame, a hollow driven shaft rotatably supported by said frame and drivingly connected with said driving shaft, a head fixed to the outer end portion of said driven shaft, a supporting rod extending through said hollow driven shaft, a reel spool fixed to said rod, a line guide carried by said head for guiding line onto said reel spool, carrier means, attaching means for attaching said carrier means to the exterior of said head, ring gear means connected to said carrier means, a power unit including power drive means, attaching means for attaching said power unit to the exterior of said frame, power transmission means connecting said power drive means with said ring gear means to drive said head, power source means including a source of electrical energy for driving said power drive means, attaching means for attaching said power source means to the exterior of said frame, and means for electrically connecting said power source with said power driving means.

2. Apparatus as defined in claim 1 wherein the power transmission means includes a driven shaft-gear unit together with an adjustable support for the shaft-gear unit, said shaft-gear unit being drivingly connected with said ring gear, the support for the shaft-gear unit being rotatable about an axis which is eccentric with respect to the axis of said ring gear whereby the shaft-gear unit may be advanced toward and away from said ring gear to an optimum meshing position relative thereto.

3. Apparatus as defined in claim 2 wherein the driven shaft-gear unit includes a plurality of gears connected in a gear train which is in driving connection with said ring gear, all of said gears having co-parallel axes which are also parallel with the axis of the power drive means.

4. Apparatus as defined in claim 1 wherein said power unit is mounted within a cylindrical casing which is surrounded by a cylindrical barrel, said cylindrical casing including a portion of said power transmission, means for fixedly adjusting the casing rotatably of said barrel to the optimum position for power transmission to said head, said barrel being open at one end and including a closure having a switch mounted thereon, said switch being connected in the electrical connection between said power source and said power driving means.

5. Apparatus as defined in claim 1 wherein said power unit and said power source are independently demountable from the frame and the electrical connections between the power unit and the power source include two coacting units joined together frictionally to remain normally connected but separable in response to opposite pulling forces of sufficient magnitude to facilitate separate removal of the power unit and power source from the frame.

6. A spinning type fishing reel comprising a hollow frame, a head rotatably supported by said frame, a reel spool mounted on said frame and being disposed substantially concentrically with respect to said head, a power unit, means for detachably connecting said power unit to an outer portion of the frame with the power unit extending outwardly therefrom, power transmission means drivingly connecting said power unit with said head, a power source means including a source of electrical energy, means for detachably connecting said power source means to an outer portion of the frame with said power source means extending outwardly thereof, said power source means being electrically connected with said power unit for energization thereof, a hollow boss extending normally outwardly from said frame, and a driving shaft drivingly connected with said head for operation thereof, said power unit and said power transmission being carried on said boss and being detachably connected thereto, whereby a conventional spinning type fishing reel is readily converted to motorized operation.

7. A spinning type fishing reel comprising a hollow frame, a head rotatably supported by said frame, a reel spool mounted on said frame and being disposed substantially concentrically with respect to said head, a power unit, means for detachably connecting said power unit to an outer portion of the frame with the power unit extending outwardly therefrom, power transmission means drivingly connecting said power unit with said head, and a power source means including a source of electrical energy, means for detachably connecting said power source means to an outer portion of the frame with said power source means extending outwardly thereof, said power source means being electrically connected with said power unit for energization thereof, a hollow boss extending normally outwardly from said frame, and a driving shaft drivingly connected with said head for operation thereof, said power unit and said power transmission being carried on said boss and being detachably connected thereto, said boss having an externally tapered surface, said power unit and power transmission having a common mounting including a tapered socket corresponding in size and pitch to the externally tapered surface of the boss and adapted to be fitted wedgingly thereon and connected thereto whereby a conventional spinning type fishing reel is readily converted to motorized operation.

8. A spinning type fishing reel comprising a hollow frame, a head rotatably supported by said frame, a reel spool mounted on said frame and being disposed substantially concentrically with respect to said head, a power unit, means for detachably connecting said power unit to an outer portion of the frame with the power unit extending outwardly therefrom, power transmission means drivingly connecting said power unit with said head, and a power source means including a source of electrical energy, means for detachably connecting said power source means to an outer portion of the frame with said power source means extending outwardly thereof, said power source means being electrically connected with said power unit for energization thereof, said hollow frame having closure means, and screw means securing said closure means to said hollow frame, said power source means including a supporting portion, said supporting portion being engaged by said screw means to fixedly secure the power source means to said frame whereby a conventional spinning type fishing reel is readily converted to motorized operation.

9. A spinning type fishing reel comprising a hollow frame, a head rotatably supported by said frame, a reel spool mounted on said frame and being disposed substantially concentrically with respect to said head, a power unit, means for detachably connecting said power unit to an outer portion of the frame with the power unit extending outwardly therefrom, power transmission means drivingly connecting said power unit with said head, and a power source means including a source of electrical energy, means for detachably connecting said power source means to an outer portion of the frame with said power source means extending outwardly thereof, said power source means being electrically connected with said power unit for energization thereof, said power unit including an electric motor and a speed reducing gear train providing a transmission between the motor and said head, said head being operatively connected with a ring gear, said ring gear being drivingly connected with said speed reducing gear train, all gears in the train being rotatable about axes which are co-parallel with each other and with the motor whereby a conventional spinning type fishing reel is readily converted to motorized operation.

10. A spinning type fishing reel comprising a hollow frame, having spaced substantially flat parallel walls, a head rotatably supported by said frame, a reel spool mounted on said frame and being disposed substantially concentrically with respect to said head, an electric motor, motor support means, means for readily connecting and disconnecting said motor support means with said frame adjacent one of said frame walls and extending outwardly from such frame wall, power transmission means drivingly connecting said motor with said head, a source of electrical energy, a casing for supporting such source of electrical energy, means for readily connecting and disconnecting said casing with said frame such that the casing is supported on the opposite one of said walls whereby said motor and said source of electrical energy comprise separate units supported at opposite sides of the frame, said casing extending outwardly away from the associated wall, and means disposed completely exteriorly of said frame and being independent thereof for providing an electrical connection between said source of electrical energy and said motor, whereby a conventional spinning type fishing reel is readily converted to motorized operation.

References Cited by the Examiner

UNITED STATES PATENTS

| 2,866,291 | 12/58 | Duell. | |
|---|---|---|---|
| 3,032,290 | 5/62 | Wallace | 242—84.21 |
| 3,075,722 | 1/63 | Stealy et al. | |

FOREIGN PATENTS 368,033   6/61   Japan.

MERVIN STEIN, *Primary Examiner*.